(12) United States Patent
Vook et al.

(10) Patent No.: US 8,559,294 B2
(45) Date of Patent: Oct. 15, 2013

(54) METHOD AND APPARATUS FOR MAJOR GROUP SCHEDULING IN A FIXED BEAM COMMUNICATION SYSTEM

(75) Inventors: Frederick W. Vook, Schaumburg, IL (US); Alan P. Rottinghaus, Barrington, IL (US); Chandrasekar Sankaran, Arlington Heights, IL (US)

(73) Assignee: Motorola Mobility LLC, Libertyville, IL (US)

( * ) Notice: Subject to any disclaimer, the term of this patent is extended or adjusted under 35 U.S.C. 154(b) by 219 days.

(21) Appl. No.: 12/845,820

(22) Filed: Jul. 29, 2010

(65) Prior Publication Data

US 2012/0027111 A1 Feb. 2, 2012

(51) Int. Cl.
*H04L 29/06* (2006.01)
(52) U.S. Cl.
USPC ............ 370/203; 370/465; 375/260; 375/267
(58) Field of Classification Search
None
See application file for complete search history.

(56) References Cited

U.S. PATENT DOCUMENTS

| | | | |
|---|---|---|---|
| 7,764,658 B2 * | 7/2010 | Garrett et al. | 370/336 |
| 2007/0049347 A1 | 3/2007 | Jin et al. | |
| 2007/0206686 A1 * | 9/2007 | Vook et al. | 375/260 |
| 2008/0002733 A1 | 1/2008 | Sutskover | |
| 2008/0198793 A1 * | 8/2008 | Lysejko et al. | 370/328 |
| 2009/0196362 A1 | 8/2009 | Song et al. | |
| 2009/0225883 A1 * | 9/2009 | Orlik et al. | 375/260 |
| 2009/0270118 A1 * | 10/2009 | Jin et al. | 455/517 |
| 2010/0158151 A1 | 6/2010 | Krauss et al. | |
| 2011/0013711 A1 * | 1/2011 | Wang et al. | 375/267 |

* cited by examiner

*Primary Examiner* — Xavier Szewai Wong

(57) ABSTRACT

An OFDMA communication system is provided that schedules partial usage of subchannels (PUSC) major groups by assigning a beam matrix of a plurality of beam matrices to each major group of multiple PUSC major groups, receiving an uplink signal from each user equipment of multiple users equipment, which uplink signal provides an indication of a channel response associated with the user equipment, determining, for each user equipment of the multiple users equipment and based on the indication of channel quality received from the user equipment, a beam matrix and major group to which to assign the user equipment, and based on the determination of a beam matrix and major group to which to assign each user equipment of the multiple users equipment, assigning two or more users equipment of the multiple users equipment to a same beam matrix and major group during a same time slot.

26 Claims, 9 Drawing Sheets

METHOD AND APPARATUS FOR MAJOR GROUP SCHEDULING IN A FIXED BEAM COMMUNICATION SYSTEM

FIELD OF THE INVENTION

The present invention generally relates to wireless communication systems and in particular to a scheduling of users in a wireless communication system employing fixed beams.

BACKGROUND OF THE INVENTION

In wireless communication systems, transmission techniques involving multiple antennas are often categorized as open-loop or closed-loop, depending on the level or degree of channel response information used by the transmission algorithm. Open-loop techniques do not rely on the information of the spatial channel response between the transmitting device and the receiving device. They typically involve either no feedback or the feedback of the long term statistical information that a base unit may use to choose between different open loop techniques.

Closed-loop transmission techniques utilize knowledge of the channel response to weight the information transmitted from multiple antennas. To enable a closed-loop transmit antenna array to operate adaptively, the array must apply transmit weights derived from channel state information (CSI) between each of the transmitter's antennas and each of the receiver's antennas which may include the channel response, its statistics or characteristics, or a combination thereof. One method to obtain the CSI is through a feedback channel between the receiver (e.g., a mobile station (MS) or User Equipment (UE)) and the transmitter (e.g., a base station (BS)). This CSI feedback channel may consist of any technique known in the art such as analog feedback of the channels, analog feedback of the statistics (for example, the covariance matrix or the eigenvector/eigenvectors), quantized feedback of the statistics, quantized feedback of the channel, or codebook feedback. Another method to obtain the CSI in Time Division Duplex (TDD) systems is to leverage multipath channel reciprocity and calculate the necessary CSI from prior transmissions received from the intended receiver.

When the CSI needed for closed-loop transmission is obtained through a feedback channel, the transmitter must have a mechanism that enables the receiver to estimate the channel between the transmitter's antennas and the receiver's antennas. The channel estimation between the transmit and the receive antennas is also needed for the calculation of non-spatial feedback information including modulation and coding rate (MCS), sub-band selection that are applicable for both open-loop and closed-loop transmissions. The usual mechanism to enable the channel estimation by the receiver is by the transmitter sending pilot signals (also known as reference symbols) from each of the transmit antennas which essentially sound the channel. A pilot signal is a set of symbols known by both the transmitter and receiver. The mobile would then use the pilot signal to compute channel estimates which can then be used to determine the CSI feedback.

In a TDD system, when the CSI needed for closed-loop transmission is obtained by leveraging multipath channel reciprocity, the mobile may send a specialized sounding waveform that allows the BS to calculate the uplink (UL) channel. The downlink channel between the BS transmit antennas and the MS receive antennas is then estimated under the assumption of reciprocity. In some cases, a specialized sounding waveform is not needed and the BS can simply leverage prior UL transmissions (e.g., data or control transmissions).

For example and referring now to FIG. 1, a time-frequency diagram 100 of an Orthogonal Frequency Division Multiplexing Access (OFDMA) frequency bandwidth is provided that illustrates a distribution of partial usage of subchannels (PUSC) major group distribution within the OFDMA frequency bandwidth. A vertical scale of time-frequency diagram 100 depicts multiple blocks of frequency (frequency subcarriers) of the frequency bandwidth. A horizontal scale of time-frequency diagram 100 depicts multiple blocks of time, such as time slot intervals 101-103, of a sub-frame that may be allocated. A major group scheduling period, also known as major group time-stripe and typically comprising one frame, in turn comprises multiple time slot intervals, each time slot interval comprising one or more time slots.

A WiMAX 20 MHz (megahertz) bandwidth comprises 120 physical clusters, where a cluster comprises 14 consecutive subcarriers, that is, 12 data subcarriers and 2 pilot subcarriers, over an OFDMA symbol. The 120 clusters are renumbered to form logical clusters, and the logical clusters are grouped to form multiple major groups. A WiMAX downlink (DL) then comprises six major groups, such as major group 1, major group 2, and major group 3 of time-frequency diagram 100, each major group comprising 6 or 8 logical clusters. Subcarriers within a major group are organized into subchannels, where a subchannel forms a minimum unit of allocation. A user, or user equipment (UE), then is assigned to receive a data transmission on one or more subchannels within a major group.

The pilots of the major group are distributed across the frequency bandwidth of the major group and are used by the UE to estimate the channel between the base station (BS) and the UE to enable the UE to demodulate the transmitted data. To enable closed loop transmission on the DL, the UE also may monitor the pilots of the assigned major group and may feed back, to the BS, channel state information (CSI) that is determined based on measurements of the pilots, for example, statistical feedback such as a covariance matrix or any other type of matrix, eignevectors, channel quality mean and variance, a received signal quality information, a channel frequency response, or any other type of channel feedback known in the art. On the other hand, in TDD where reciprocity is leveraged, the CSI for enabling closed-loop DL transmissions can be determined from UL transmissions such as sounding, data transmissions or control transmissions. Then, based on the CSI, the BS may determine optimal beamforming weights in order to beamform DL signals for transmission to the UE over the major group.

In the IEEE 802.16-2009 standard for OFDMA transmission with the PUSC subchannelization, the pilots of a major group are shared amongst all subchannels that belong to the major group. All UEs that are assigned to receive data on subchannels within the major group leverage the same set of pilots to demodulate their received data. In a TDD deployment where adaptive closed-loop transmission is enabled by leveraging reciprocity, the pilots within a major group and within a time-slot interval (see FIG. 1) must be beamformed in the same way as the data so that both pilots and data go through the same aggregate channel. The pilots cannot be "broadcast" or "per-transmit-antenna" in this situation because there is no provision for informing the MS of the transmit weights used on the data transmission. (With broadcast or per-antenna pilots, the UE would need to know both the per-antenna DL channel and the transmit weights.) As a result of this shared pilot constraint, all subchannels of the major group must be beamformed in the same way. As a further result, it is therefore not possible within a major group and within a time-slot to beamform to one user on one subchannel with one set of transmit weights while also beamforming to another user on a different subchannel with a different set of transmit weights. Note that the term "major group time slot" is used to refer to a portion of the time-frequency resources consisting of one major group in frequency and one time slot interval in time. Furthermore, note that the term major group time stripe refers to a portion of the time-frequency resources consisting of one major group in frequency and one entire time stripe in time (where a time stripe refers to a frame consisting of multiple consecutive time slot intervals).

As a result of these constraints, in WiMAX systems using PUSC subchannelization, the transmit weights used to beamform the downlink data must be fixed at least over a major group time slot. Furthermore, if the beamforming transmit weights are adaptively and uniquely calculated for each user, then only one user can be allocated to a major group time slot since the entire major group time slot will be beamformed according to the user's CSI. As a result, an 802.16e-OFDMA system that uses adaptive and unique transmit weights for each user has a minimum allocation constraint of one major group time slot. Unfortunately, with small size packets, this minimum allocation constraint can often result in unassigned (wasted) resources. For example and referring to FIG. 1, in a depicted time-slot interval, DL signals intended for a first UE are transmitted to the UE over major group 1 and beam 1, DL signals intended for a second UE are transmitted to the second UE over major group 2 and beam 2, DL signals intended for a third UE are transmitted to the third UE over major group 3 and beam 3, and so on.

When a UE receives data on the downlink in this situation, these constraints cause additional constraints on the channel estimation algorithm that the UE may use. When estimating the channel for its allocation, the UE generally must only use pilots that go through the same channel as the data it is attempting to decode (otherwise channel estimation performance will be degraded). As a result, in an 802.16e-OFDMA system that uses adaptive and unique transmit weights for each UE, the UE may not use pilots outside of its allocation for channel estimation. Thus, as a result of the above-mentioned constraints, for each major group time-stripe, the per-UE DL channel allocation granularity is an entire major group time slot and each beam is uniquely associated with a single UE. If a user's data fails to consume the entire bandwidth of the major group, for example, where the user traffic consists of lots of small data packets such as in VoIP (Voice over Internet Protocol) transmissions, then the remainder of the major group will remain unused and bandwidth will be wasted. This problem is worsened when a MIMO-Matrix B transmission scheme is used because the bandwidth requirements (i.e., the required time-frequency allocation size) for a data packet of a specified size are even smaller than when a MIMO-Matrix B transmission scheme is not used. In addition, in a closed loop WiMAX system using transmit weights that are adaptively and uniquely computed for the UE, the UE may use only pilots belonging to its allocation for estimating the channel for DL demodulation, which may result in suboptimal DL channel estimation performance compared to situations where pilots outside of its allocation are usable by the UE.

Therefore, a need exists for an improved system of beamforming and DL scheduling, which does not have the wasted system capacity of the prior art and which provides improved DL channel estimation over the closed loop feedback schemes of the prior art.

Figure 1:
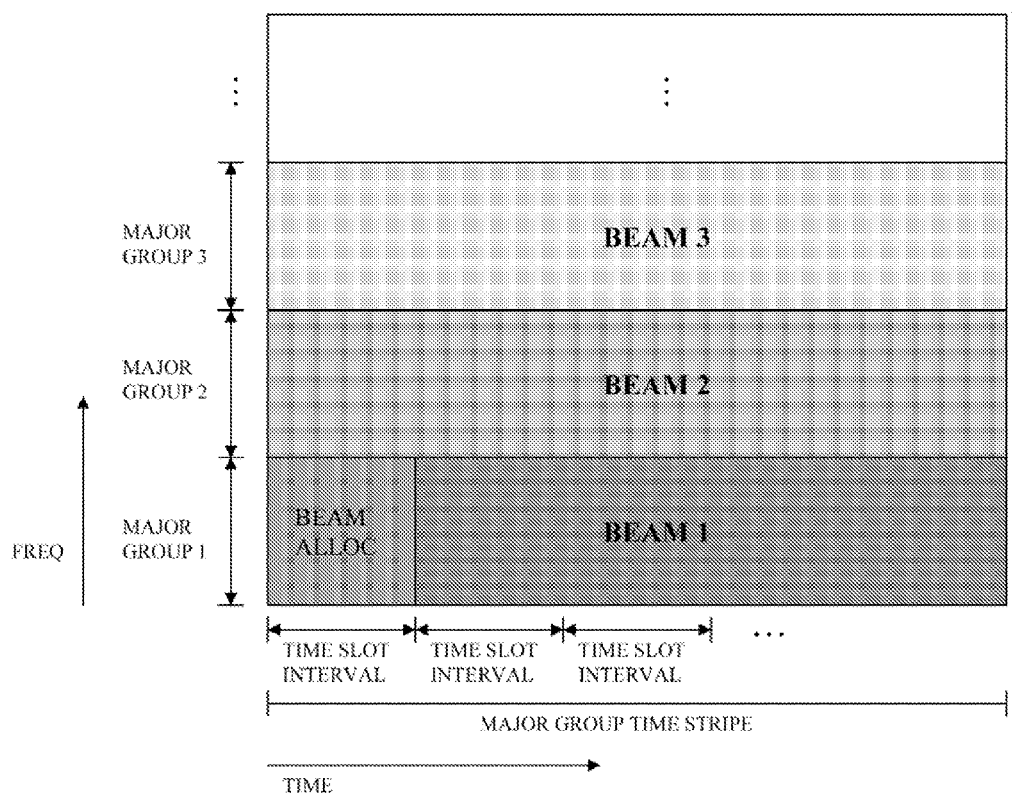
FIG. 1 is a time-frequency diagram of an orthogonal frequency division multiplex access (OFMDA) frequency bandwidth of the prior art.

One of ordinary skill in the art will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION OF THE INVENTION

To address the need that exists for a method and apparatus that provides an improved system of beamforming and DL scheduling and which does not have the wasted system capacity of the prior art and which provides improved DL channel estimation over the closed loop feedback schemes of the prior art, an OFDMA communication system is provided that schedules partial usage of subchannels (PUSC) major groups by assigning a beam matrix of a plurality of beams to each major group of multiple PUSC major groups, receiving an uplink signal from each user equipment of multiple user equipments, which uplink signal provides an indication of a channel response associated with the user equipment, determining, for each user equipment of the multiple user equipments and based on the indication of channel quality received from the user equipment, a beam matrix and major group to which to assign the user equipment, and based on the determination of a beam matrix and major group to which to assign each user equipment of the multiple user equipments, assigning two or more user equipments of the multiple user equipments to a same beam matrix and major group during a same time slot, wherein information is transmitted to the user equipment over the beam matrix. Furthermore, information may be transmitted over the beam matrix via a spatial diversity transmission scheme (e.g., Matrix A in WiMAX) or via a spatial multiplexing transmission scheme (e.g., Matrix B in WiMAX).

Generally, an embodiment of the present invention encompasses a method for scheduling PUSC major groups in a wireless communication system. The method includes assigning a beam matrix of a plurality of beams to each major group of a plurality of PUSC major groups, receiving an uplink signal from each user equipment of a plurality of user equipments, which uplink signal provides an indication of a channel response associated with the user equipment, determining, for each user equipment of the plurality of user equipments and based on the indication of channel quality received from the user equipment, a beam matrix and major group to which to assign the user equipment, and based on the determination of a beam matrix and major group to which to assign each user equipment of the plurality of user equipments, assigning two or more user equipments of the plurality of user equipments to a same beam matrix and major group during a same time slot, wherein information is transmitted to the user equipment over the beam matrix. Furthermore information may be transmitted over the beam matrix via a spatial diversity transmission scheme (e.g., Matrix A in WiMAX) or via a spatial multiplexing transmission scheme (e.g., Matrix B in WiMAX).

Another embodiment of the present invention encompasses an apparatus capable of scheduling PUSC major groups in a wireless communication system, the apparatus comprising a processor that is configured to assign a beam matrix of a plurality of beams to each major group of a plurality of PUSC major groups, receive an uplink signal from each user equipment of a plurality of user equipments, which uplink signal provides an indication of a channel response associated with the user equipment, determine, for each user equipment of the plurality of user equipments and based on the indication of channel quality received from the user equipment, a beam matrix and major group to which to assign the user equipment, and based on the determination of a beam matrix and major group to which to assign each user equipment of the plurality of user equipments, assign two or more user equipments of the plurality of user equipments to a same beam matrix and major group during a same time slot, wherein information is transmitted to the user equipment over the beam matrix. Furthermore information may be transmitted over the beam matrix via a spatial diversity transmission scheme (e.g., Matrix A in WiMAX) or via a spatial multiplexing transmission scheme (e.g., Matrix B in WiMAX).

Figure 2:
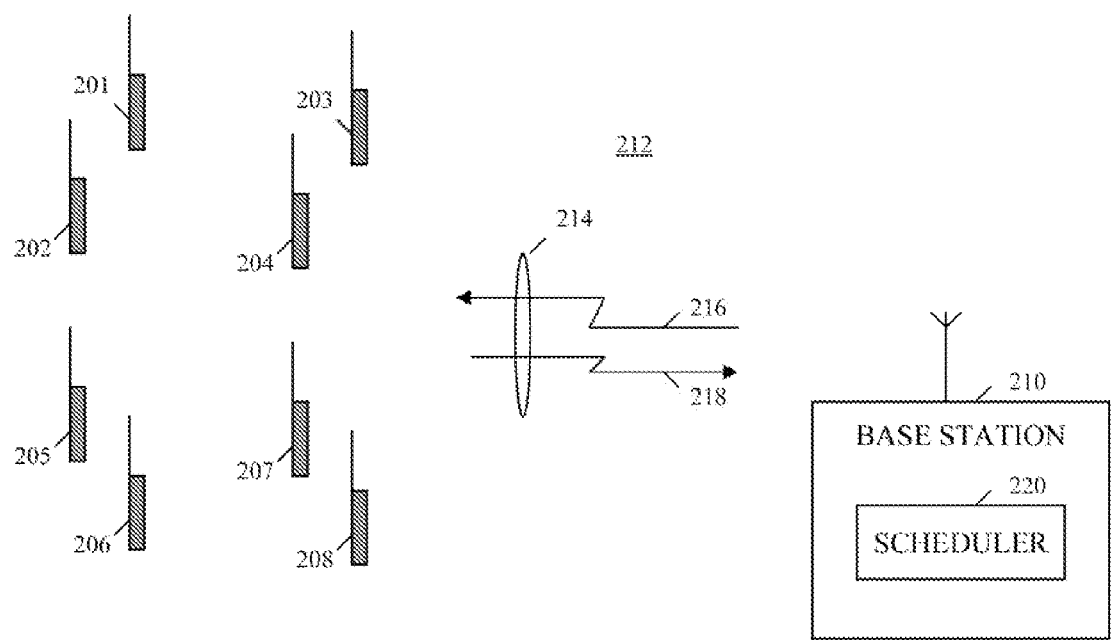
FIG. 2 is a block diagram of an OFMDA communication system in accordance with various embodiments of the present invention.

The present invention may be more fully described with reference to FIGS. 2-12. FIG. 2 is a block diagram of a wireless communication system 200 in accordance with various embodiments of the present invention. Communication system 200 includes multiple user equipments (UEs) 201-208 (eight shown), such as but not limited to a cellular telephone, a radio telephone, a personal digital assistant (PDA) with radio frequency (RF) capabilities, or a wireless modem that provides RF access to digital terminal equipment (DTE) such as a laptop computer. In various technologies, the UEs may be referred to as mobile stations (MSs), subscriber units (SUs), subscriber stations (SSs), access terminals (ATs), and the like. Communication system 200 further includes at least one base station (BS) 210, such as a Node B, an eNode B, an Access Point (AP), or a Base Transceiver Station (BTS), that supports Multiple-Input Multiple-Output (MIMO) communications and that provides communication services, via a corresponding air interface 214, to user equipments (UEs), such as UEs 201-208, residing in a coverage area 212, such as a cell or a sector of a cell, of the BS. Air interface 214 includes a downlink (DL) 216 and an uplink (UL) 218, that in turn each comprises multiple communication channels, including multiple control/signaling channels, including pilot channels, and multiple traffic channels.

BS 210 further includes a scheduler 220 that performs the scheduling functions described herein as being performed by the BS, such as scheduling DL and UL data transmissions for UEs serviced by the BS, such as UEs 201-208, and assigning the UEs to major groups and beam matrices for such transmissions. However, in another embodiment of the present invention, scheduler 220 may reside in another network element separate from and in communication with BS 210.

Communication system 200 comprises a wideband communication system that employs an Orthogonal Frequency Division Multiplexing Access (OFDMA) modulation scheme for transmitting data over an air interface, wherein a frequency bandwidth employed by the communication system is split into multiple frequency subchannels during a given time period, which subchannels are the minimum frequency resource unit that may be allocated by BS 210. Each subchannel comprises multiple orthogonal frequency subcarriers, which subcarriers may be contiguous or may be distributed across the bandwidth, over a given number of OFDM symbols, or time slots, that are the physical layer channels over which traffic and signaling channels are transmitted in a TDM or TDM/FDM fashion.

In addition, communication system 200 preferably comprises a WiMAX communication system that operates according to the IEEE 802.16e standards, which specify wireless telecommunications system operating protocols, including radio system parameters and call set up and processing procedures. A WiMAX 20 MHz (megahertz) bandwidth comprises 120 physical clusters, where a cluster comprises 14 consecutive subcarriers, that is, 12 data subcarriers and 2 pilot subcarriers, over an OFDMA symbol. The 120 clusters are renumbered to form logical clusters, and the logical clusters are grouped to form multiple partial usage of subchannels (PUSC) major groups. A WiMAX downlink (DL) then comprises six major groups, each major group comprising 6 or 8 logical clusters and thus comprising subcarriers that are distributed across the bandwidth. Subcarriers then are mapped to subchannels in each major group. However, those who are of ordinary skill in the art realize that communication system 200 may operate in accordance with any wireless telecommunication system employing an OFDMA modulation scheme, such as other WiMAX communication systems (for example, 5 MHz or 10 MHz WiMAX systems), a 3GPP (Third Generation Partnership Project) LTE (Long Term Evolution) or a 3GPP2 Evolution or Phase 2 communication system, for example, a CDMA (Code Division Multiple Access) 2000 1XEV-DV communication system, a Wireless Local Area Network (WLAN) communication system as described by the IEEE (Institute of Electrical and Electronics Engineers) 802.xx standards, for example, the 802.11a/HiperLAN2, 802.11g, or 802.16 standards, or any of multiple proposed ultra wideband (UWB) communication systems.

Figure 3:
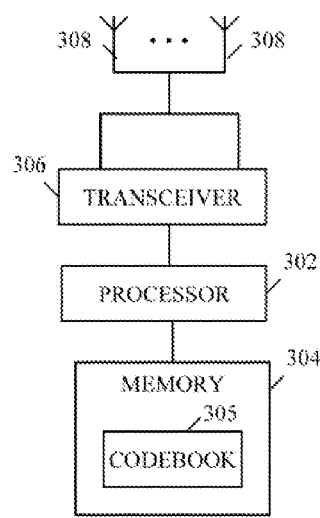
FIG. 3 is a block diagram of a user equipment of the communication system of FIG. 2 in accordance with various embodiments of the present invention.
Figure 4:
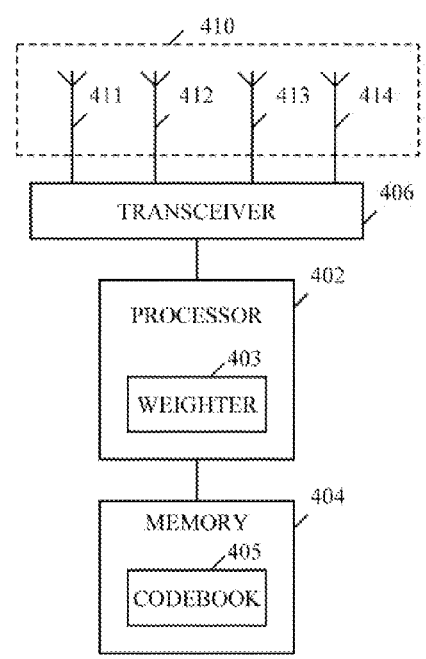
FIG. 4 is a block diagram of a base station of the communication system of FIG. 2 in accordance with various embodiments of the present invention.

Referring now to FIGS. 3 and 4, block diagrams are provided of a UE 300, such as UEs 201-208, and BS 210 in accordance with various embodiments of the present invention. Each of UE 300 and BS 210 includes a respective processor 302, 402, such as one or more microprocessors, microcontrollers, digital signal processors (DSPs), combinations thereof or such other devices known to those having ordinary skill in the art. The particular operations/functions of processors 302 and 402, and respectively thus of UE 300 and BS 210, are determined by an execution of software instructions and routines that are stored in a respective at least one memory device 304, 404 associated with the processor, such as random access memory (RAM), dynamic random access memory (DRAM), and/or read only memory (ROM) or equivalents thereof, that store data and programs that may be executed by the corresponding processor. Each of at least one memory devices 304 and 404 may further maintain a respective codebook 305, 405 for implementation of codebook-based feedback.

Processor 402 of BS 210 implements scheduler 220 based on software instructions and routines that are stored in the at least one memory device 404 of the BS. However, when scheduler 220 is included in a network element separate from, and in communication with, the BS, for example, in a separate scheduling module (not shown) or in an access network controller (not shown) coupled to the BS, the scheduler may comprise its own processor and at least one memory device that stores data and programs that may be executed by the corresponding processor, or may be implemented by the processor of the network element based on software instructions and routines that are stored in the at least one memory device of the network element.

Each of UE 300 and BS 210 further includes a respective transceiver 306, 406 coupled to the processor 302, 402 of the UE or BS. Each transceiver 306, 406 includes receiving circuitry (not shown) and transmitting circuitry (not shown) for exchanging signals with UEs 201-208 via an intervening air interface, such as air interface 214. UE 300 includes one or more antennas 308 and, in the event the UE comprises multiple antennas, may support MIMO communications. For example, when UE 300 includes two antennas, a first antenna of the two antennas may be used from transmissions by the UE (a transmit antenna) while the first antenna and a second antenna of the two antennas may be used for reception of signals by the UE (receiving antennas). BS 210 includes an antenna array 410 that is in communication with transceiver 406 and that comprises multiple antennas 411-414 (four shown). By utilizing an antenna array to transmit signals to a UE located in a coverage area of the BS, such as a cell or sector serviced by the antenna array, the BS is able to utilize MIMO techniques for the transmission of the signals.

BS 210 further includes weighting circuitry 403, such as a precoder or any other type of signal weighter used to beamform a signal, that is implemented by processor 402. The term "beam" is used herein to denote the vector of weights used to beamform a single signal path. The term "beam matrix" is used herein to denote a matrix of weights that beamform multiple signal paths or streams (one path or stream for each beam). In another embodiment of the present invention, weighting circuitry 403 may reside in BS 210 separate from, and be coupled to, processor 402. Weighting circuitry 403 weights signals applied to the multiple antennas 411-414 of the BS based on channel state information (CSI) fed back by a UE, for example, statistical feedback such as a covariance matrix or any other type of matrix, eignevectors, channel quality mean and variance, a received signal quality information, a channel frequency response, or any other type of channel feedback known in the art, in order to beamform the signals for transmission to the UE over the downlink of the intervening air interface. Alternatively, in Time Division Duplex (TDD) systems, weighting circuitry 403 may leverage UL-DL reciprocity and weight signals applied to the multiple antennas 411-414 of the BS based on UL transmissions such as sounding, data transmissions or control transmissions.

Figure 5:
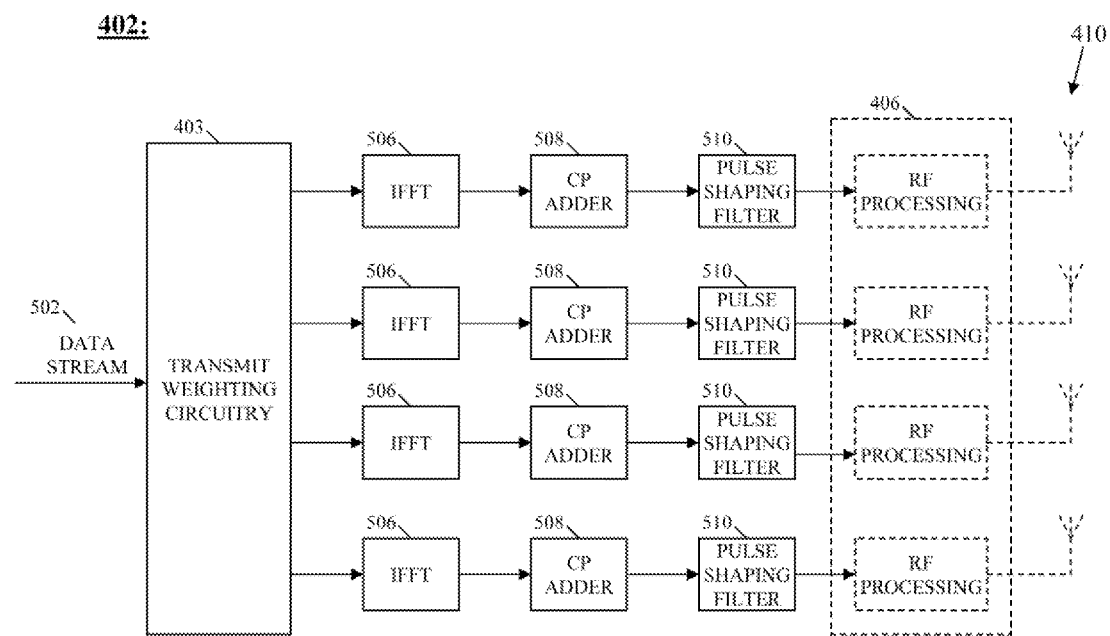
FIG. 5 is a block diagram of an architecture of a processor of the base station of FIG. 4 in accordance with an embodiment of the present invention.

Referring now to FIG. 5, an architecture is provided of processor 402 of BS 210 in accordance with an embodiment of the present invention. As depicted in FIG. 5, BS 210 implements a frequency-domain oriented transmission system, such as OFDM, in which the transmission schemes are performed in the frequency domain prior to transmission. As depicted in FIG. 5, processor 402 comprises frequency domain weighting circuitry 403 that receives and beamforms a data stream 502 for transmission, one or more inverse fast Fourier transforms (IFFTs) 506 coupled to the frequency domain weighting circuitry, cyclic prefix (CP) adders 508 coupled to the IFFTs, and output filters 510 coupled to the CP adders. However, in other embodiments of the present invention, weighting circuitry 403 may reside in BS 210 separate from, and be coupled to, processor 402.

Figure 9:
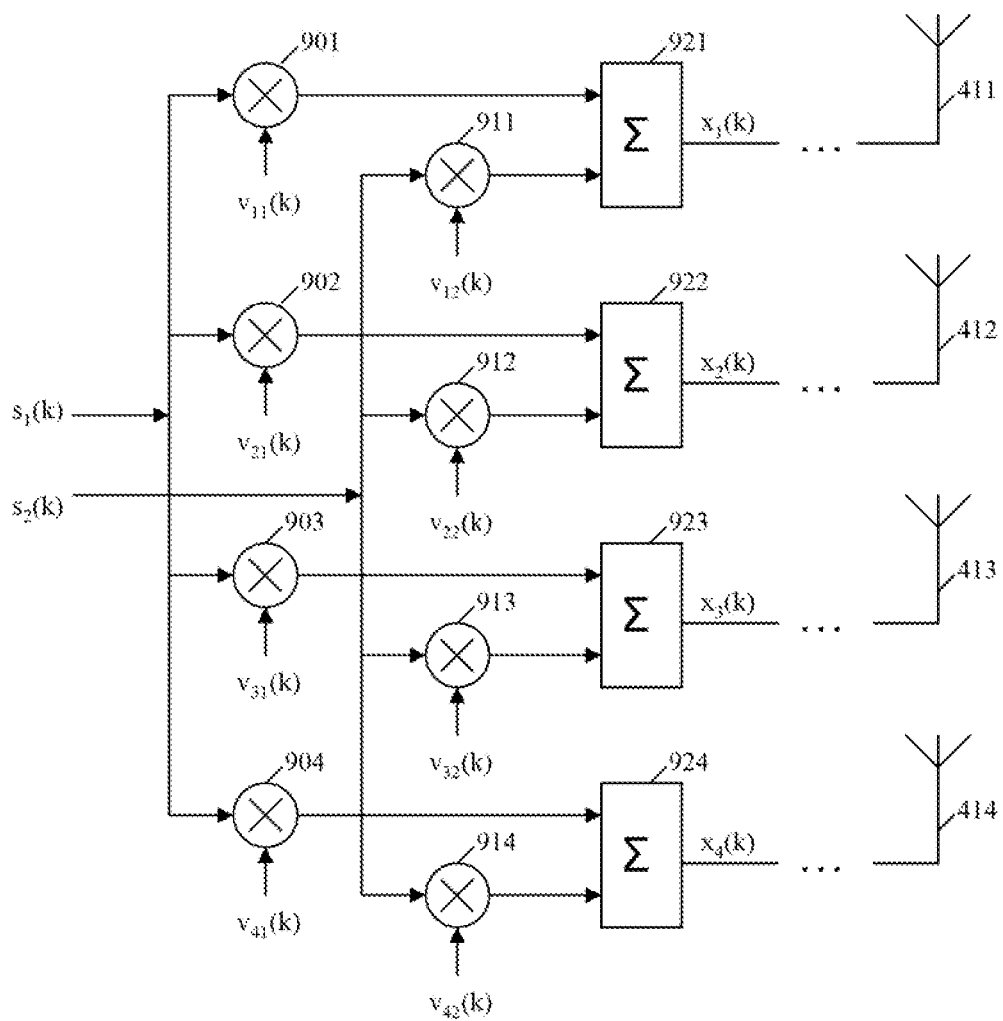
FIG. 9 is a schematic diagram for applying weights to a full array transmit mixing mode of the base station of FIG. 2 in accordance with an embodiment of the present invention.
Figure 10:
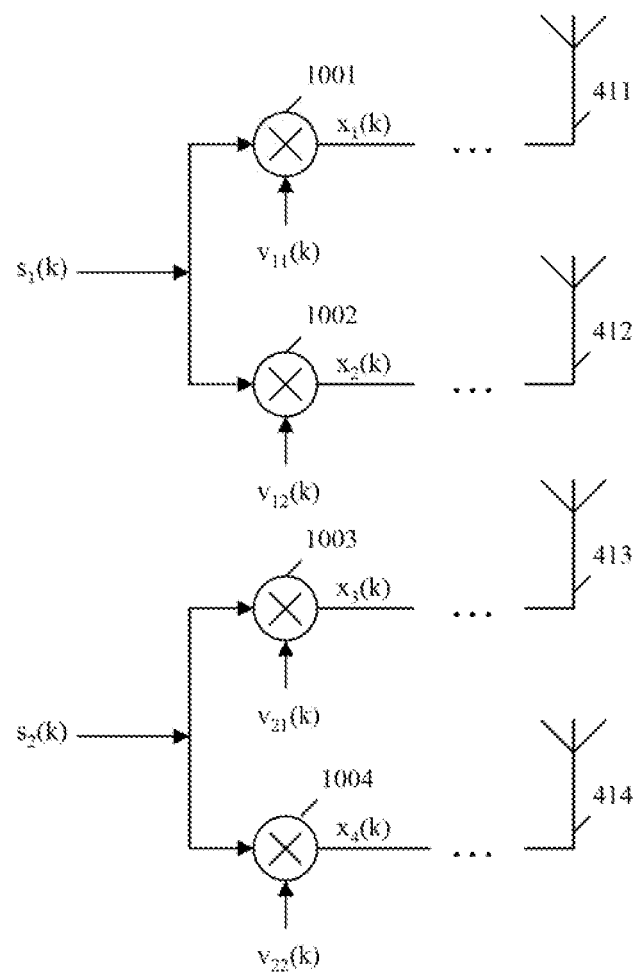
FIG. 10 is a schematic diagram for applying weights to a sub-array transmit mixing mode of the base station of FIG. 2 in accordance with an embodiment of the present invention.

Processor 402 routes the one or more data streams 502 to frequency domain weighting circuitry 403. Frequency domain weighting circuitry 403 implements the weighting function, as depicted in FIGS. 9 and 10, by applying a weighting factor (beam or beam matrix) to each subcarrier in the frequency domain. Thus, the transmit signal can be tailored either spatially, or in frequency, or both. The outputs of the frequency domain weighting circuitry 403 are then transformed into the time domain by Inverse Fourier Transforms (IFFTs) 506. Cyclic prefixes are added at cyclic prefix (CP) adders 508 as is known in the art, and transmit filtering then is performed at output filters 510 before routing the output signals to transceiver 406 for radio frequency (RF) processing and transmission via the antennas of antenna array 410.

Figure 6:
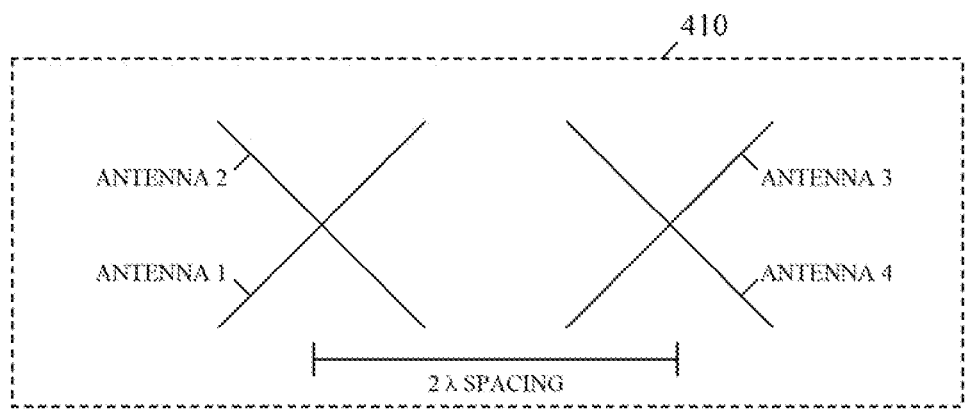
FIG. 6 is a block diagram of a dual antenna access point ("Dual DAP") base station antenna configuration of the base station of FIG. 2 in accordance with various embodiments of the present invention.
Figure 7:
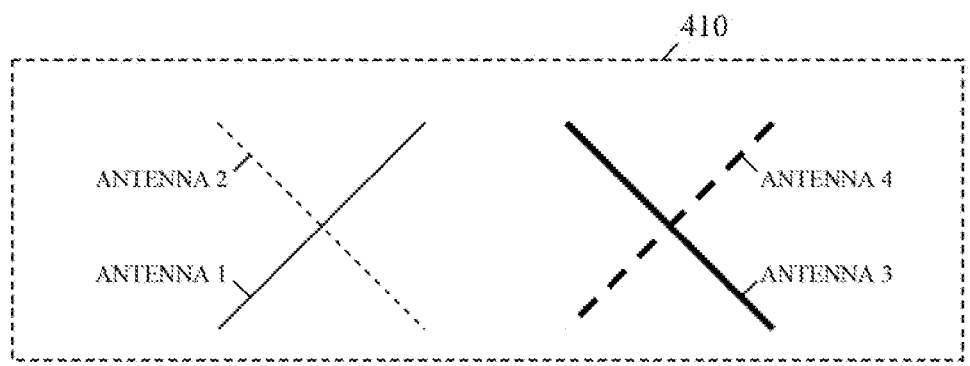
FIG. 7 is a first antenna pairing and ordering within pairs for the "Dual DAP" configuration of FIG. 6 in accordance with an embodiment of the present invention.
Figure 8:
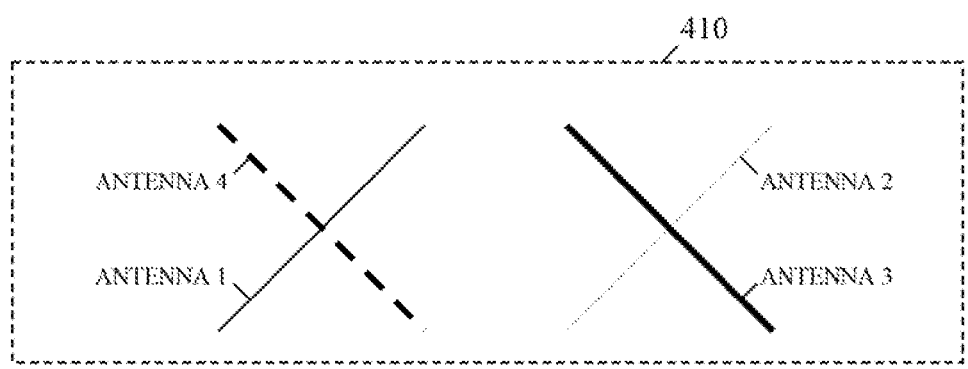
FIG. 8 is a second antenna pairing and ordering within pairs for the "Dual DAP" configuration of FIG. 6 in accordance with an embodiment of the present invention.

Referring now to FIGS. 6-8, in various embodiments of the present invention antenna array 410 of BS 210 may be configured as a dual diversity access point ("Dual DAP") having a linear antenna array or having two cross-polarized pairs of antennas.

FIG. 6 depicts a "Dual DAP" base station antenna configuration 600 having two cross-polarized pairs of antennas in accordance with various embodiments of the present invention. In the "Dual DAP" configuration depicted in FIGS. 6-8, antenna array 410 comprises two pairs of +/−45 degree slant polarized antennas, spaced two wavelengths (λ) apart. As depicted in FIG. 6, in the "Dual DAP" base station antenna configuration 600 having two cross-polarized pairs of antennas, each antenna pair is a cross-polarized, collocated pair of antennas, with a spacing of 2 wavelengths (λ) between the pairs of antennas, that is, antennas 1 and 2 and antennas 3 and 4. The "antenna-order" may be defined as a(i)=(1, 2, 4, 3) or (1, 3, 4, 2), in which the list a(i) provides the physical antenna number for antenna index i. In this notation, the first two entries are the physical antennas for the first pair while the second two entries are antennas for the second pair. The odd entries denote the first antenna of a pair, while the even entries denote the second antenna of a pair.

FIG. 7 depicts a first antenna pairing and ordering 700 for the "Dual DAP" configuration of FIG. 6, and FIG. 8 depicts a second antenna pairing and ordering 800 within pairs for the "Dual DAP" configuration of FIG. 6. The "Dual DAP" antenna array configuration may be used with either of the two different antenna orderings. The first antenna pairing and ordering 700 is a (1, 2, 4, 3) antenna configuration where the first pair of antennas is denoted by the thinner lines 1, 2 and the second pair of antennas is denoted by the thicker lines 3 and 4. The first antenna pairing and ordering 700 groups the antennas 411-414 so that co-located cross polarized antennas are paired together for beamforming. The second antenna array pairing and ordering 800 is a (1, 3, 4, 2) antenna configuration that groups the antennas 411-414 so that the antennas with the same vertical orientation, that is, polarization slant, are paired together for beamforming. The first pair corresponds to the (1, 2) having the thinner lines and the second pair (3, 4) having the thicker lines. Within the above pairs, the first antenna is solid and the second antenna is dashed. In FIGS. 7 and 8, the numbers labeling of the antennas across the top indicate which antenna index is assigned to the given physical antenna. In FIG. 7, antenna 411 corresponds to physical antenna 1, antenna 412 corresponds to physical antenna 2, antenna 413 corresponds to physical antenna 4, and antenna 414 corresponds to physical antenna 3, while in FIG. 8, antenna 411 corresponds to physical antenna 1, antenna 412 corresponds to physical antenna 3, antenna 413 corresponds to physical antenna 4, and antenna 414 corresponds to physical antenna 2.

BS 210 further may operate in a 'full array' transmit mixing mode, or beamforming configuration, or a 'sub-array' transmit mixing mode or beamforming configuration. FIG. 9 is a schematic diagram 900 for applying weights by weighting circuitry 403 when BS 210 is operating in the full array transmit mixing mode. In the full array transmit mixing mode, multiple transmit streams, in this example two transmit streams, for an OFDM subcarrier k, denoted as $s_1(k)$ and $s_2(k)$, are concurrently transmitted (beamformed) by two beam weight vectors that together comprise a beam matrix. The two transmit streams, $s_1(k)$ and $s_2(k)$, each are multiplied (beamformed) by a plurality of beam weight vectors for each of multiple antenna paths of antenna array 410. Thus, transmit stream $s_1(k)$ is multiplied by a first beam weight vector, that is, weights $v_{11}(k)$, $v_{21}(k)$, $v_{31}(k)$, and $v_{41}(k)$, respectively via multipliers 901-904, that is, multiplier 901 in a first antenna path, multiplier 902 in a second antenna path, multiplier 903 in a third antenna path, and multiplier 904 in a fourth antenna path, where k is the subcarrier, the index i of $v_{ij}(k)$ denotes the transmit antenna 1, 2, 3 or 4, and the index j of $v_{ij}(k)$ denotes the stream where j=1 or 2. The output of multipliers 901-904 are summed in summers 921-924, respectively. The transmit stream $s_2(k)$ is multiplied by a second beam weight vector, that is, weights $v_{12}(k)$, $v_{22}(k)$, $v_{32}(k)$ and $v_{42}(k)$, respectively via multipliers 911-914, that is, multiplier 911 in the first antenna path, multiplier 912 in the second antenna path, multiplier 913 in the third antenna path and multiplier 914 in a fourth antenna path. The output of multipliers 911-914 are summed in summers 921-924, respectively. The outputs of the summers 921-924 respectively produce outputs $x_1(k)$, $x_2(k)$, $x_3(k)$ and $x_4(k)$ on the transmit antennas 411-414 of transmit array 410.

FIG. 10 is a schematic diagram 1000 for applying weights by weighting circuitry 403 when BS 210 is operating in the sub-array transmit mixing mode. In the sub-array transmit mixing mode, multiple transmit streams, in this example two transmit streams, denoted as $s_1(k)$ and $s_2(k)$, are concurrently transmitted (beamformed) by two beam weight vectors that together comprise a beam matrix. The two transmit streams, $s_1(k)$ and $s_2(k)$, each are each multiplied by a plurality of beam weight vectors for each of the antenna path of a respective sub-array of antenna array 410. Thus, transmit stream $s_1(k)$ is multiplied by a first weight vector, that is, weights $v_{11}(k)$ and $v_{12}(k)$, via multiplier 1001 in a first antenna path to antenna 411 and multiplier 1002 in a second antenna path to antenna 412 of a first sub-array of antenna array 410, where k is the subcarrier, the index i of $v_{ij}(k)$ denotes the stream where i=1 or 2, and the index j of $v_{ij}(k)$ denotes the antenna j=1 or 2 of the sub-array. Antennas 411 and 412 are a first sub-array of antenna array 410 for transmitting the first stream transmission from base station 210. Transmit stream $s_2(k)$ is multiplied by a second weight vector, that is, weights $v_{21}(k)$ and $v_{22}(k)$, via multiplier 1003 in a first antenna path to antenna 413 and multiplier 1004 in a second antenna path to antenna 414 of a second sub-array of antenna array 410, again where k is the subcarrier, the index i of $v_{ij}(k)$ denotes the stream 1 or 2, and the index j of $v_{ij}(k)$ denotes the antenna j=1 or 2 of the sub-array. Antennas 413 and 414 are a second sub-array of antenna array 410 for transmitting the second stream transmission from BS 210.

The embodiments of the present invention preferably are implemented within UEs 201-208, BS 210, and scheduler 220, and more particularly with or in software programs and instructions stored in the at least one memory devices associated with the UEs, BS, and scheduler and executed by the processors associated with the UEs, BS, and scheduler. However, one of ordinary skill in the art realizes that the embodiments of the present invention alternatively may be implemented in hardware, for example, integrated circuits (ICs), application specific integrated circuits (ASICs), and the like, such as ASICs implemented in one or more of UEs 201-208, BSs 210 and 220, and scheduler 220. Based on the present disclosure, one skilled in the art will be readily capable of producing and implementing such software and/or hardware without undo experimentation. Furthermore, unless otherwise specified herein, the functions described herein as being performed by BS 210 are preferably performed by scheduler 220, or alternatively may be distributed among the scheduler and other components of the BS.

Figure 11:
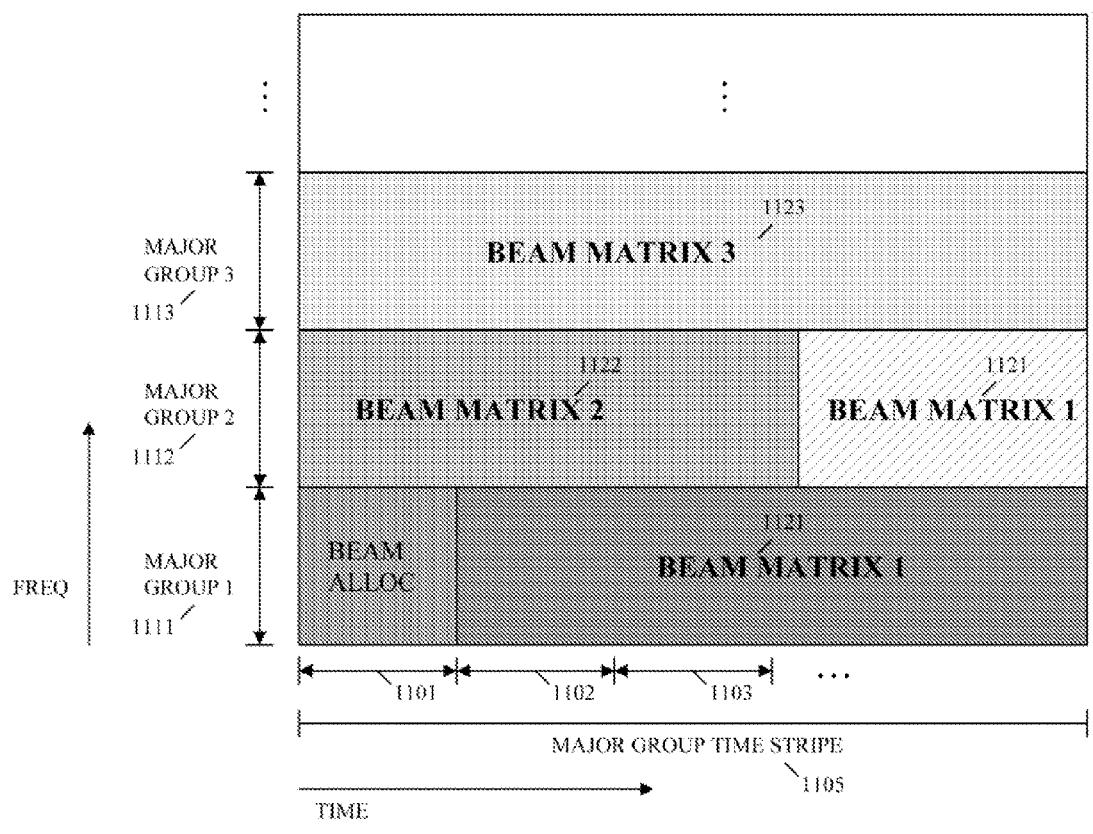
FIG. 11 is a time-frequency diagram of an OFDMA frequency bandwidth that may be employed by communication system of FIG. 2 in accordance with various embodiments of the present invention.

FIG. 11 depicts a time-frequency diagram 1100 of an OFDMA frequency bandwidth that may be employed by communication system 200 in accordance with various embodiments of the present invention. A vertical scale of time-frequency diagram 1100 depicts multiple blocks of frequency (frequency subcarriers) of the frequency bandwidth. As noted above, a WiMAX 20 MHz (megahertz) bandwidth comprises 120 physical clusters, where a cluster comprises 14 consecutive subcarriers, that is, 12 data subcarriers and 2 pilot subcarriers, over an OFDMA symbol. The 120 clusters are renumbered to form logical clusters, and the logical clusters are grouped to form multiple major groups. A WiMAX downlink (DL) then comprises six major groups, such as major groups 1111-1113 (three shown), each major group comprising 6 or 8 logical clusters. For each major group, the pilots of the major group are distributed across the frequency bandwidth of the major group. As mentioned earlier, the pilots are beamformed in the same way as the data and allow the UE to estimate the DL channel that includes the aggregation of the transmit precoding or beamforming weights and the RF multipath channel.

A horizontal scale of time-frequency diagram 1100 depicts multiple blocks of time, such as time slot intervals 1101-1103, of a sub-frame that may be allocated. As is known in the art, each time slot interval comprises one or more time slots (that is, OFDM symbols) and a major group time-stripe 1105 typically comprises one frame and includes multiple time slot intervals.

The time slot interval is the smallest time period for which major group scheduling and beam allocation may be fixed. That is, for each major group, the UEs scheduled for, that is, assigned to, the major group and the weights (that is, beam matrix) used to beamform a DL transmission of the major group, are fixed over a time slot interval 1101-1103. For example, for time slot interval 1102, a first major group 1111 of the multiple major groups is transmitted using a first beam matrix 1121, which first beam matrix is generated by BS 210 using a first set (or vector(s)) of beamforming weights, a second major group 1112 of the multiple major groups is transmitted using a second beam matrix 1122, which second beam matrix is generated by BS 210 using a second set (or vector(s)) of beamforming weights, a third major group 1113 of the multiple major groups is transmitted using a third beam matrix 1123, which third beam is generated by BS 210 using a third set (or vector(s)) of beamforming weights, and so on. However, within a major group time-stripe, the beamforming weights and corresponding beam matrix used to transmit the major group may be fixed or may vary from time slot interval-to-time slot interval. Additionally, the beamforming weights and corresponding beam matrix used to convey the major group may vary or may be fixed from one time-stripe to a next time-stripe. Furthermore, in order to assure that the pilots and data of a major group all go through a same aggregate channel, the pilots and data of a major group are all beamformed in the same way.

Note that in the above description for using a "beam matrix" to transmit on a major group, the term "beam matrix" is used herein to include the cases where more than one stream is being beamformed on the major group. In the above description, when a plurality of data streams are beamformed with a beam matrix, the data streams may be comprised of information that is encoded via a spatial diversity transmission strategy (e.g., the Matrix A transmission scheme in WiMAX) or encoded via a spatial multiplexing strategy (e.g., the Matrix B transmission scheme in WiMAX).

The collection of beams or beam matrices used to beamform on the major groups should be carefully chosen to optimize the performance of the system. For example, for the one-stream beamforming case (e.g., where the major groups are part of a SIMO (Single Input Multiple Output) zone in 802.16e), for best performance, the beams that are selected to transmit on the major groups must be chosen in such a way that preferably all users in the coverage area of a sector can be served by one of the beams with performance better than the case where the sector uses omni-directional antennas. As an example, consider a uniform linear array that provides coverage to a sector of a cell. One way to select the beams is to choose some number of quasi-non-overlapping beams that cover the sector. Methods of calculating such a collection of beams are known in the art. As another example, the beams that are chosen to transmit data on the major groups may be selected from a codebook of rank 1 beams that are used in the prior art as part of a codebook feedback scheme. Such a collection of beams (codebook of beams) are generally chosen to provide good coverage of the space of channels that a user may experience. As a result, such codebooks generally provide a suitable collection of beams to assign to the different major groups. For the two-stream case (e.g., a STC (Space Time Coding) zone in an 802.16e system), a rank 2 codebook from the prior art may be used as the collection of beams matrices that are assigned to the major groups (where a beam matrix in this example is an M×2 beamforming matrix over which two streams are beamformed).

In order to preserve system capacity, communication system 200 provides for multiple UEs to be assigned to a major group and an associated beam or beam matrix for DL transmissions of user data during a given major group time slot interval. That is, for a given major group and a given time slot interval, multiple UEs may be assigned subchannels in a same major group and further are assigned to a same beam matrix. In turn, each beam matrix may be optimized for one or more of the UEs assigned to that beam. For example, the weights selected to beamform the DL transmissions to the multiple UEs assigned a same major group and beam may be optimal weights for one of the multiple UEs or may be weights that are optimized for transmission to two or more of the multiple UEs but that are not necessarily optimal for any one of the multiple UEs. Furthermore, as the frequency bandwidth of a major group is limited, when the UEs assigned to a major group and corresponding beam during a given major group time slot interval consume all available bandwidth, then additional UEs for which the beam is a 'best' beam may instead be assigned to a second best beam during the given time slot interval or may be assigned to a different major group that also is transmitted over that 'best' beam.

Thus, communication system 200 matches UEs to a best available beam matrix of a collection of multiple beam matrices, as opposed to the prior art which creates a beam that is specifically matched to a UE. While a possible result of this beam assignment scheme is that the weights utilized to beamform a DL transmission of user data to a UE may not be the optimal beamforming weights for that particular UE, the tradeoff is an increase in system capacity as multiple UEs may share a single beam and major group for DL transmissions of user data during a given major group time slot interval. As a result, the major group resources are used more efficiently.

Furthermore, in order to improve DL channel estimation performance, communication system 200 provides for a UE to detect and feedback channel quality information associated with pilots outside of the UEs allocated subchannels. This provision is described further below.

Figure 12:
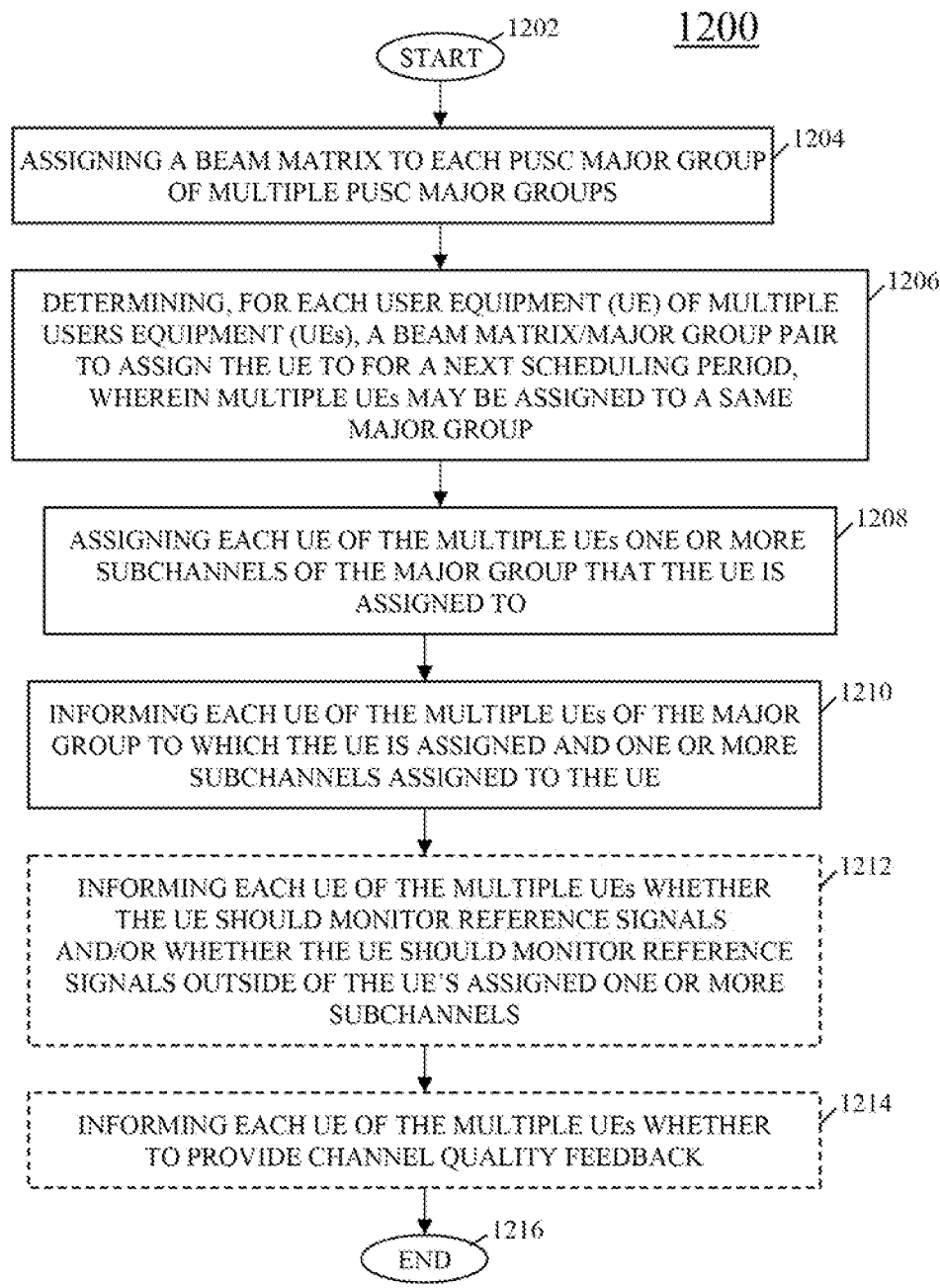
FIG. 12 is a logic flow diagram depicting a method performed by communication system of FIG. 2 in scheduling user equipments for downlink transmissions and beamforming of those transmissions in accordance with various embodiments of the present invention.

Referring now to FIG. 12, a logic flow diagram 1200 is provided that depicts a method performed by communication system 200 in scheduling UEs for DL transmissions and beamforming those transmissions in accordance with various embodiments of the present invention. Logic flow diagram 1200 begins (1202) when BS 210 assigns (1204) a beam matrix to each PUSC major group of multiple PUSC major groups for a given scheduling period, that is, a major group time slot interval during which the pairings of the beams matrices and PUSC major groups shall remain fixed. In assigning a beam matrix to each major group, the BS selects, and associates with the major group, a set of beamforming weight vectors that will be used to generate the beam matrix over which the allocations of the major group will be transmitted.

That is, within a major group time slot interval, comprising one or more time slots (subchannels), the beam matrices stay fixed. Furthermore, the same beam matrix may be used by a same major group within an entire major group time-stripe, where a time-stripe comprises multiple major group slot intervals. However, during a time-stripe and between major group time slot intervals, the beam matrix allocated to a major group may change to better match user, that is, UE, allocation requirements. From another perspective, a beam matrix may be allocated to major group for an integer number of time stripes, or a fraction of a time-stripe, or an integer number of time stripes plus a fraction of a time-stripe. Thus a same beam matrix may be reused by more than one major group during a time-stripe, and in turn a major group may use different beam matrices during a single time-stripe. For multiple beam matrices within a major group time-stripe, each major group may be allocated one or more beam matrices across the time-stripe, depending upon UE allocation requirements. That is, BS 210 may calculate a new beam matrix that will better match the UEs assigned to the major group.

Multiple UEs may be assigned a same major group during a time slot interval. Each such UE may be assigned a different subchannel of the multiple subchannels with the major group during the time slot interval instead of the prior art of assigning the entirety of the major group to a single UE during the time slot. However, UEs assigned a subchannel of a major group during a time slot interval may, when providing channel quality feedback, monitor all pilots of the major group and provide feedback based on all of the monitored pilots.

The selection of a set of weight vectors used to generate the beam matrices, and the assignment of the beams to the major groups, may be in accordance with any algorithm, or assignment scheme, that may occur to one of ordinary skill in the art. For example, a selection of a set of weight vectors used to generate each beam vector of the beam matrix may be predetermined (e.g., formed from a codebook as described earlier), may be random, or may be adaptively determined for a scheduling period based on channel quality feedback received from one or more UEs, such as UEs 201-208, served by the BS or UL signals received by the BS from the UEs. For example, a selection of a set of weight vectors used to generate a beam matrix may be based on one or more of a determination of an optimal set of beamforming weight vectors for a UE that may use that beam matrix or a determination of a set of beamforming weight vectors that is good for each of multiple UEs that may use that beam matrix but not necessarily optimal for any one of the multiple UEs. Similarly, the assignment of a beam matrix to a major group may be predetermined, may be random, or may be adaptively determined for a scheduling period based on factors such as a number of UEs served by the BS, channel quality feedback received from the UEs served by the BS, UL signals received by the BS from the UEs, and so on.

The BS 210 then performs user-to-beam-matrix matching. That is, the BS determines (1206), for each UE of the multiple UEs 201-208 that are scheduled for a DL transmission of user data in a next scheduling period, which beam matrix/major group pair, that is, which set of beamforming weight vectors and corresponding major group, to assign the UE to, wherein two or more UEs of the multiple UEs 201-208 may be assigned to a same beam matrix/major group pair. For example, UEs 201-203 may be assigned to major group 1111 and beam matrix 1121, UEs 204-206 may be assigned to major group 1112 and beam matrix 1122, and UEs 207 and 208 may be assigned to major group 1113 and beam matrix 1123. Further, based on the channel quality feedback received by BS 210 from each UE or the UL signals received by the BS from the UE, BS 210 assigns (1208) one or more subchannels of the assigned major group to the UE in accordance with any of various channel assignment schemes known in the art.

Generally, one may assume that a "best" beam matrix, that is, a set of beamforming weight vectors that is best for a UE on one major group will also be the "best" beam matrix for the UE for another major group. As a result, if the beam matrices are permanently assigned to the major group, for example, that major group 1111 is always transmitted in beam matrix 1121, major group 1112 is always transmitted in beam matrix 1122, and so on, then the decision of which major group is best for a UE is the same as the decision of which beam matrix is best for the UE, and the decision of which major group to assign to the UE is decided once a beam matrix is selected for the UE or visa versa.

A 'best' beam matrix, that is, a 'best' set of beamforming weight vectors, for a UE is a beam or set of beamforming weight vectors, from among all available sets of beamforming weight vectors and corresponding beams, that optimally shapes a beam for a downlink transmission to the UE, that is, that will provide a highest signal quality for a transmission of a downlink signal to the UE. Two particular cases to consider in WiMAX systems (and other similar systems): first, if the major group time stripe is part of the normal SIMO (Single Input Multiple Output) zone, wherein all transmissions are single stream transmissions, then each major group is assigned a single beamforming weight vector from a set of available beamforming vectors; and second, if the major group time stripe is part of the STC (Space Time Coding) zone, wherein all transmissions are from two "virtual" antennas, then each major group would be assigned a pair of beamforming weight vectors (one for each "virtual" antenna being created) to beamform two streams to the UEs assigned to the major group. In the STC zone in WiMAX systems, a space time coding scheme is selected to encode the data transmitted on the two virtual antennas (where the virtual antennas are created by the beam matrix). Two STC schemes are available in WiMAX systems, that is, Matrix A and Matrix B schemes, where the Matrix A scheme is a rank 1 spatial diversity method while Matrix B is a rank 2 spatial multiplexing scheme, as is described in the IEEE 802.16-2009 standard. All scheduling methodologies and beamforming options described herein apply regardless of whether a single beam vector is allocated to each major group (for SIMO zone, one stream transmission) or whether a beam pair (beam matrix) is allocated to each major group (STC zone, two stream transmission). Extensions to a number of streams larger than two are similarly feasible.

In determining, at step 1206, for each UE of the multiple UEs that are scheduled for a DL transmission of user data in a next scheduling period, which beam matrix and corresponding major group to assign to the UE, BS 210 determines, for each UE of multiple UEs served by the BS and to be scheduled for a DL transmission of user data during a next scheduling period, that is, UEs 201-208, a beamforming weight metric for the UE based on an uplink signal received from the UE that provides an indication of a channel quality between the BS and the UE. That is, BS 210 determines for each UE, based on UL signals received by the BS from the UE or based on channel quality feedback received from the UE, at least one set of beamforming weights vectors for beamforming a DL transmission to that UE. For example, BS 210 may determine, for the UE, an optimal, that is, best, set of beamforming weights vectors for beamforming a DL transmission to that UE, a second best set of beamforming weights vectors for beamforming a DL transmission to that UE, a third best set of beamforming weights vectors for beamforming a DL transmission to that UE, and so on. BS 210 then determines a beamforming weight metric for the UE that is based the one or more sets of beamforming weights vectors determined for the UE.

In various embodiments of the invention, the determination of a set of beamforming weight vectors for a UE may be codebook-based or may be calculated on an ad hoc basis by BS 210, and in particular by scheduler 220. In addition, the BS may calculate the beamforming weights for DL transmissions of user data to the UEs based on channel quality feedback from the multiple UEs, 201-208 or based on UL transmissions by the UEs. For example, in Time Division Duplexing (TDD), channel sounding assumes a reciprocity of the UL and DL channels and also assumes BS 210 has a means of accounting for any non-reciprocities that may exist in the BS transceiver hardware. During a sounding interval, the UE transmits, over the frequency bandwidth, a predetermined reference signal, such as a specialized waveform used for sounding the bandwidth, known to both BS 210 and the UE. However, in another embodiment wherein a DL channel to a UE is estimated based on UL signals, BS 210 may utilize any UL signal, such as an UL control signal or UL data. In such an instance, the BS may estimate channel conditions associated with the UE based on a quality of the received signal, such as a received signal strength, various signal to interference or noise ratios such as a signal-to-interference ratio, a carrier-to-interference ratio, a signal power to noise power ratio, a bit error rate, or any other signal quality metric known in the art. Based in the signal received from the UE, BS 210 estimates a BS-to-UE channel response and determines, based on the estimated channel response, a set of weight vectors for beamforming the DL transmission to the UE.

When the UE has only a single transmit antenna as opposed to multiple antennas, channel estimation for determining the best transmit weights for the DL may be more complicated but still doable. For example, U.S. patent application Ser. No. 12/340,857, which application is assigned to Motorola, Inc., and is hereby incorporated herein in its entirety, describes methodologies for rank-2 beamforming based on UL signals received from a UE utilizing a single transmit antenna.

In another embodiment of the present invention and referring now to FIGS. 9 and 12, a selection of a beam matrix and major group for a UE is described with respect to an embodiment when BS 210 is operating in a full array beamforming configuration. When operating in full array beamforming configuration, for each weight matrix in codebook 405 that is used to beamform a major group, the BS applies a first transmit weight vector of the weight matrix to all antennas of the antenna array 410 of the BS and also applies a second transmit weight vector of the weight matrix to all antennas of the antenna array 410 of the BS. Assuming that BS 210 is using a codebook 405 to select weights for beamforming a DL transmission of a major group, the codebook may contain a collection of multiple weight matrices of dimension M, wherein 'M' is the number of antennas in the antenna array. Assuming use of rank-2 codebooks, a $j^{th}$ weight matrix $W_j$ may be defined by the following equation, $W_j=[v_{1j}\ v_{2j}]$, where $v_{1j}$ and $v_{2j}$ are vectors of beamforming weights. In such an instance, BS 210 may select a beam as follows. BS 210 computes an 'M×M' covariance matrix based on the single antenna UL sounding received from a UE at each of the 'M' antennas of antenna array 410. BS 210 then computes a largest eigenvector $e_1$ of the covariance matrix and, for each weight matrix 'i' in the codebook, computes a first beamforming metric, and in particular a codebook metric, based on the computed eigenvector, preferably a metric '$(v_{1i}'^*e_1+v_{2i}'^*e_1)/2$,' where $v_{1i}'$ is the Hermitian of $v_{1i}$ and $v_{2i}'$ is the Hermitian of $v_{2i}$. BS 210 then may assign the UE to the beam matrix having a largest metric, or the BS may convey to scheduler 220 the best two or three beam matrices, that is, the two or three beam matrices having the largest metrics, and the scheduler may decide which major group and beam matrix to put the UE on.

In yet another embodiment of the present invention and referring now to FIGS. 10 and 12, a selection of a beam matrix and major group for a UE is described with respect to an embodiment when BS 210 is operating in a sub-array configuration, and preferably when the BS is utilizing a cross-polarized array. When operating in a sub-array configuration and utilizing a cross-polarized array, for each weight matrix in codebook 405 that is used to beamform a major group, BS 210 applies a first weight vector of the weight matrix to one-half of the multiple antennas of antenna array 410 of the BS, for example, the +45° antennas, and applies a second weight vector of the weight matrix to the other half of the antennas of the antenna array, for example, the −45° antennas. Again, assuming BS 210 is using a codebook 405 to select weights for beamforming a DL transmission of a major group, the codebook may contain a collection of multiple beam matrices of dimension (M/2)×2, wherein 'M' is the number of antennas in the antenna array. Each of the +45° antennas and the −45° antennas may use a same length 'M/2' weight vector, as it is assumed that the polarization of the antennas of antenna array 410 allows for a separation, at the UE, of the streams transmitted by each sub-array.

BS 210 then assigns one weight vector $v_i$ from codebook 405 to each major group. In one cross-polarized sub-array embodiment, BS 210 may select a beam for a UE as follows. BS 210 computes two 'M×2' covariance matrices (one for the +45° antennas and one for the −45° antennas) based on the single antenna UL sounding received from a UE at each of the 'M' antennas of antenna array 410. BS 210 then computes a largest eigenvector of the each of the two covariance matrices, that is, eigenvectors $e_1$ and $e_2$, and for each beam matrix 'i' (that is, set of weight vectors associated with a beam matrix 'i') in the codebook, computes a second beamforming metric, and in particular a beam metric, based on the computed eigenvectors, preferably a metric '$(v_i'^*e_1+v_i'^*e_2)/2$,' where $v_i$ is a codebook weight vector for the $i^{th}$ beam and is the Hermitian of $v_i$. However, in another embodiment of the present invention, the codebook weight vector associated with each of the +45° and −45° antennas in computing the beam metric may be a different weight vector instead of a same weight vector. BS 210 then assigns the UE to a beam matrix, and associated major group, associated with the largest beam metric, or the BS may convey to scheduler 220 the best two or three beam matrices, that is, the two or three beam matrices having the largest metrics, and the scheduler may decide which major group and beam matrix to put the UE on.

In another cross-polarized sub-array embodiment, BS 210 may select a beam matrix for a UE as follows. BS 210 computes one 'M×M' covariance matrix based on the single antenna UL sounding received from a UE at each of the 'M' antennas of antenna array 410. BS 210 then computes a largest eigenvector of the covariance matrix, that is, eigenvectors $e_1$. Let $w_{i1}$ represent an M-element extension of a codebook weight vector $v_i$ for the $i^{th}$ beam matrix where the corresponding elements of $v_i$ are assigned to each of the +45° antennas and zero (0) is assigned to each of the −45° antennas, and let $w_{i2}$ represent an M-element extension of a codebook weight vector $v_i$ for the $i^{th}$ beam matrix where the corresponding elements of $v_i$ are assigned to each of the −45° antennas and zero (0) is assigned to each of the +45° antennas. BS 210 then computes, for each beam 'i' in the codebook, a beam metric based on $w_{i1}$ and $w_{i2}$, preferably computing, for each beam matrix 'i,' the metric '$(w_{i1}'^*e_1+w_{i2}'^*e_1)/2$,' where $w_{i1}'$ is the Hermitian of $w_{i1}$ and $w_{i2}'$ is the Hermitian of $w_{i2}$. However, in another embodiment of the present invention, the codebook weight vectors associated with each of the +45° and −45° antennas in computing the beam metric may be different weight vectors instead of a same weight vectors. BS 210 then assigns the UE to a beam matrix, and associated major group, associated with the largest beam metric, or the BS may convey to scheduler 220 the best two or three beam matrices, that is, the two or three beam matrices having the largest metrics, and the scheduler may decide which major group and beam matrix to put the UE on.

In still another embodiment of the present invention, where the beam matrix-to-major group mapping is nominally one-to-one and the mapping varies sufficiently slowly, BS 210 may cycle through each beam matrix/major group and request each UE 201-208 to provide channel quality feedback, for example, CQI, for each major group. BS 210 then may determine a best beam matrix for each UE based on the channel quality feedback provided by the UE for the beam matrices/major groups. In particular, a major group with a highest reported channel quality would be the best beam matrix for the UE. Note that in this description and in the description to follow, the concepts described apply equally to the case where a beam (rank 1) is being used or whether a beam matrix is being used.

In some instances, scheduler 220 may need to assign a UE to a beam matrix other than a 'best' beam matrix for the UE, that is, a beam matrix associated with a best channel response for the UE. That is, each major group has a limited number of subchannels that may be assigned to UEs. When the demand for subchannels, by UEs for which the first beam matrix is a best beam matrix, exceeds a threshold, for example, a number of subchannels available in the major group associated with the first beam matrix, then one or more such UEs for which the first beam matrix is a best beam matrix may instead be assigned to a second best beam matrix, and a second major group, for that UE during the given scheduling period.

In one such embodiment of the present invention, BS 210 may rank each UE for which the first beam matrix is a best beam matrix, in order of detrimental impact upon the UE of assigning the UE to a second best beam matrix for that UE. For example, the UEs may be ranked in order of a difference between a first codebook metric, or beam metric, calculated for the UE in association with the first beam matrix, and a second codebook metric, or beam metric, calculated for the UE in association with the second best beam matrix for that UE. BS 210 then assigns UEs to either the first beam matrix or another beam matrix based on this differential, where UEs with the larger differentials are assigned to the first beam matrix until the UE capacity of the first beam matrix is attained, and the remaining UEs, which UEs have smaller differentials than the UEs assigned to the first beam matrix, are assigned to another beam matrix and major group (preferably, the second best beam matrix for that UE). For example, a first beam matrix 1121, associated with a first major group 1111, may be a best beam matrix for each of multiple UEs 201-203, whereas the subchannels available in major group 1111 may be sufficient to support only two of the three UEs. In such an event, BS 210 may assign each of a first UE 201 and a second UE 202 of the multiple UEs 201-203 to the first beam matrix 1121 and the first major group 1111 during a time slot interval, and assign a third UE 203 of the multiple UEs 201-203 to a second beam matrix, such as beam matrix 1122, and a second major group 1112 during the time slot interval. Note that although this discussion considered the case where a beam matrix is assigned to a major group, this discussion also applies to the case where a beam vector is being used.

In another embodiment of the present invention, in order to accommodate more UEs in a best beam matrix than there is bandwidth available in a corresponding major group, BS 210 may assign a UE to the UE's best beam matrix but may allocate subchannels to the UE that span major groups. For example, and referring now to FIG. 11, a UE may be assigned to beam matrix 1121 while allocated subchannels both in major group 1111 and major group 1112. As a result, the subchannels allocated to the UE from major group 1111 and from major group 1112 then are transmitted to the UE utilizing beam matrix 1121.

After matching each UE of the multiple UEs 201-208 to a beam matrix/major group pair, BS 210 informs (1210) the UEs of the major groups (and thereby the corresponding beam) to which each UEs is assigned by conveying, to the UEs, a major group assignment message. Preferably, the major group assignment message is a map message, such as a channel assignment message, that includes a mapping of the UEs to frequency and time resources, that is, subchannels of the major groups and time slots, of the OFDMA bandwidth that are allocated to the UE. The UE may be specifically informed of the major group to which it is assigned or, by informing the UE of the subchannels allocated to the UE, the UE may be implicitly informed of the major group to which it has been assigned. In addition, BS 210, for example, via the major group assignment message, may further inform (1212) each UE whether the UE should monitor reference signals, that is, pilot signals, outside of the UE's allocated frequency resources and provide channel quality feedback on those monitored resources, and/or how far (frequency-wise) outside of the allocated frequency resources the UE should monitor reference signals and provide channel quality feedback. For example, when the UE is not specifically instructed to provide channel quality feedback, the UE may monitor reference signals only within its allocated frequency resources and provide channel quality feedback only on those monitored resources (as opposed to the frequency resources of the entire major group to which the UE has been assigned). By way of another example, when the UE is not specifically instructed to provide channel quality feedback, the then UE may monitor the reference signals throughout an entire major group and provide channel quality feedback based on those monitored signals.

In another embodiment of the present invention, BS 210 further may instruct (1214), for example, via the major group assignment message, some but not all of the UEs assigned to a major group to provide channel quality feedback during a particular scheduling period. For example, a first group of UEs assigned to a major group may be instructed to provide channel feedback, for example, CQI, determined from the pilots of the major group while a second group of UEs assigned to the major group may be instructed not to provide channel feedback. In one such embodiment of the present invention, the determination of whether all, or fewer than all, UEs assigned to a major group during a same time slot are instructed to provide channel feedback may depend upon a number of beams/beam matrices assigned to the major group during a time-stripe. When a single beam or beam matrix is allocated to a major group during a time-stripe, then all UEs assigned the major group may be instructed to provide channel feedback for the major group. When multiple beams or beam matrices are allocated to a major group during a time-stripe (i.e., the same beam/beam matrix was not used to transmit the entire stripe), then a first group of UEs may be instructed to provide channel feedback for the major group over all time slots of the time-stripe, including time slots where they are not assigned a DL traffic channel, while a second group of UEs may be instructed to provide channel feedback for the major group only over time slots where they are assigned a DL traffic channel. For example, the UEs of the first group may be UEs that possibly may use for channel estimation the pilots from time slots that are not specifically assigned to the UEs. This scheme provides for the UEs in the first group to have a potential for better DL channel estimation performance than UEs in the second group of UEs. Logic flow 1200 then ends (1216).

In another embodiment of the present invention, when a beam matrix allocated to a major group changes from time slot-to-time slot, or from time-stripe-to-time-stripe, then a usefulness of channel feedback averaging, and in particular of CQI averaging as known in the art, will degrade. In order to reduce the possible degradation of the long-term averaging of CQI, the beam matrix-to-major group assignments may be extended over a longer period of time, that is, the frequency, in time, of a changing of the assignment of a beam to a major group and/or a changing of the assignment of UEs to a beam/major group may be reduced.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the communication system. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. The terms 'including' and/or 'having', as used herein, are defined as comprising. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions. An element preceded by " . . . a" does not, without more constraints, preclude the existence of additional identical elements in the process, method, article, or apparatus.

What is claimed is:

1. A method for scheduling partial usage of subchannels (PUSC) major groups in a wireless communication system, the method comprising:
    assigning a beam matrix of a plurality of beam matrices to each PUSC major group of a plurality of PUSC major groups;
    receiving an uplink signal from each user equipment of a plurality of user equipments, which uplink signal provides an indication of a channel response associated with the user equipment;
    selecting, for each user equipment of the plurality of user equipments and based on the indication of channel quality received from the user equipment, a beam matrix from the beam matrices assigned to each PUSC major group and an associated PUSC major group, to which the beam matrix is assigned, from the plurality of PUSC major groups to assign to the user equipment; and
    based on the selection of a beam matrix and PUSC major group to which to assign each user equipment of the plurality of user equipments, assigning two or more user equipments of the plurality of user equipments to a same beam matrix and PUSC major group during a same time slot, wherein information is encoded and transmitted over the beam matrix.

2. The method of claim 1 wherein the information is encoded according to one or more of a spatial diversity transmission scheme and a spatial multiplexing transmission scheme and transmitted over the beam matrix.

3. The method of claim 1, wherein assigning a beam matrix to each PUSC major group of a plurality of PUSC major groups comprises assigning a set of weight vectors to each PUSC major group of the plurality of PUSC major groups, wherein the set of weight vectors is used to beamform a downlink transmission.

4. The method of claim 1, wherein the assignment of a beam matrix to each PUSC major group of the plurality of PUSC major groups is fixed for a PUSC major group time-stripe.

5. The method of claim 1, wherein the assignment of a beam matrix to each PUSC major group of the plurality of PUSC major groups is fixed for one or more time slots but varies within a PUSC major group time-stripe.

6. The method of claim 1, wherein assigning two or more user equipments of the plurality of user equipments to a same beam matrix and PUSC major group during a same time slot comprises assigning, to each of the two or more user equipments, one or more subchannels of the PUSC major group.

7. The method of claim 6, further comprising assigning subchannels of a plurality of PUSC major group to a user equipment during the time slot, which subchannels of a plurality of PUSC major groups are transmitted over a same beam matrix during the time slot.

8. The method of claim 1, wherein the beam matrix is a first beam matrix and the PUSC major group is a first PUSC major group, wherein the two or more user equipments comprise a first user equipment and a second user equipment, wherein the first beam matrix is a best beam matrix for a downlink transmission of user data to a third user equipment of the plurality of user equipment, and wherein the method further comprises assigning the third user equipment to a second beam matrix and a second PUSC major group during the time slot.

9. The method of claim 1, wherein assigning two or more user equipments of the plurality of user equipments to a same beam matrix and PUSC major group during a same time slot comprises, for each of the two or more user equipments:
    computing a beamforming metric in association with each set of weight vectors of a plurality of sets of weight vectors, wherein each set of weight vectors is associated with a beam matrix of the plurality of beam matrices; and
    assigning each user equipment of the two or more user equipments to a beam matrix and PUSC major group based on the beamforming metrics computed for that user equipment.

10. The method of claim 9, wherein computing a beamforming metric in association with each set of weight vectors of a plurality of sets of weight vectors comprises:
    computing a covariance matrix based on an uplink signal received from the user equipment via each antenna of a plurality of antennas of an antenna array;
    for each weight matrix of a codebook comprising a plurality of weight matrices, computing a codebook metric based on the computed covariance matrix.

11. The method of claim 10, wherein computing a beamforming metric in association with each set of weight vectors of a plurality of sets of weight vectors comprises:
    computing a plurality of covariance matrices based on an uplink signal received from the user equipment via each antenna of a plurality of antennas of an antenna array;
    computing an eigenvector for each covariance matrix of the plurality of covariance matrices;

for each beamforming weight vector of a plurality of a beamforming weight vectors, computing a beam metric based on the computed eigenvectors.

12. The method of claim 1, wherein assigning two or more user equipments of the plurality of user equipments to a same beam matrix and PUSC major group during a same time slot comprises assigning each of the two or more user equipments one or more subchannels of the PUSC major group and wherein the method further comprises instructing at least one of the two or more user equipments to monitor reference signals of the PUSC major group that are outside of the subchannels assigned to the user equipment.

13. An apparatus capable of scheduling partial usage of subchannels (PUSC) major groups in a wireless communication system, the apparatus comprising a processor that is configured to assign a beam matrix of a plurality of beam matrices to each PUSC major group of a plurality of PUSC major groups, receive an uplink signal from each user equipment of a plurality of user equipments, which uplink signal provides an indication of a channel response associated with the user equipment, determine select, for each user equipment of the plurality of user equipments and based on the indication of channel quality received from the user equipment, a beam matrix from the beam matrices assigned to each PUSC major group and an associated PUSC major group, to which the beam matrix is assigned, from the plurality of PUSC major groups to assign to the user equipment, and based on the selection of a beam matrix and PUSC major group to which to assign each user equipment of the plurality of user equipments, assign two or more user equipments of the plurality of user equipments to a same beam matrix and PUSC major group during a same time slot, wherein information is encoded and transmitted over the beam matrix.

14. The apparatus of claim 13 wherein the information is encoded according to one or more of a spatial diversity transmission scheme and a spatial multiplexing transmission scheme and transmitted over the beam matrix.

15. The apparatus of claim 13, wherein the processor is configured to assign a beam matrix to each PUSC major group of a plurality of PUSC major groups by assigning a set of weight vectors to each PUSC major group of the plurality of PUSC major groups, wherein the set of weight vectors is used to beamform a downlink transmission.

16. The apparatus of claim 13, wherein the assignment of a beam matrix to each PUSC major group of the plurality of PUSC major groups is fixed for a PUSC major group time-stripe.

17. The apparatus of claim 13, wherein the assignment of a beam matrix to each PUSC major group of the plurality of PUSC major groups is fixed for one or more time slots but varies within a PUSC major group time-stripe.

18. The apparatus of claim 13, wherein the processor is configured to assign two or more user equipments of the plurality of user equipments to a same beam matrix and PUSC major group during a same time slot by assigning, to each the two or more user equipments, one or more subchannels of the PUSC major group.

19. The apparatus of claim 18, wherein the processor further is configured to assign subchannels of a plurality of PUSC major groups to a user equipment during the time slot, which subchannels of a plurality of PUSC major groups are transmitted over a same beam matrix during the time slot.

20. The apparatus of claim 13, wherein the beam matrix is a first beam matrix and the PUSC major group is a first PUSC major group, wherein the two or more user equipments comprise a first user equipment and a second user equipment, wherein the first beam matrix is a best beam matrix for a downlink transmission of user data to a third user equipment of the plurality of user equipment, and wherein the processor further is configured to assign the third user equipment to a second beam matrix and a second PUSC major group during the time slot.

21. The apparatus of claim 13, wherein the processor is configured to assign two or more user equipments of the plurality of user equipments to a same beam matrix and PUSC major group during a same time slot by, for each of the two or more user equipments:
  computing a beamforming metric in association with each set of weight vectors of a plurality of sets of weight vectors, wherein each set of weight vectors is associated with a beam matrix of the plurality of beam martrices; and
  assigning each user equipment of the two or more user equipments to a beam matrix and PUSC major group based on the beamforming metrics computed for that user equipment.

22. The apparatus of claim 21, wherein the processor is configured to compute a beamforming metric in association with each set of weight vectors of a plurality of sets of weight vectors by:
  computing a covariance matrix based on an uplink signal received from the user equipment via each antenna of a plurality of antennas of an antenna array;
  for each weight matrix of a codebook comprising a plurality of weight matrices, computing a codebook metric based on the computed covariance matrix.

23. The apparatus of claim 21, wherein the processor is configured to compute a beamforming metric in association with each set of weight vectors of a plurality of sets of weight vectors by:
  computing a plurality of covariance matrices based on an uplink signal received from the user equipment via each antenna of a plurality of antennas of an antenna array;
  computing an eigenvector for each covariance matrix of the plurality of covariance matrices;
  for each beamforming weight vector of a plurality of a beamforming weight vectors, computing a beam metric based on the computed eigenvectors.

24. The apparatus of claim 13, wherein the processor is configured to assign two or more user equipments of the plurality of user equipments to a same beam matrix and PUSC major group during a same time slot by assigning each of the two or more user equipments one or more subchannels of the PUSC major group and wherein the process further is configured to instruct at least one of the two or more user equipments to monitor reference signals of the PUSC major group that are outside of the subchannels assigned to the user equipment.

25. A scheduler comprising the apparatus of claim 13.

26. A base station comprising the apparatus of claim 13.

* * * * *